(12) United States Patent
Wang et al.

(10) Patent No.: US 11,682,765 B2
(45) Date of Patent: Jun. 20, 2023

(54) ELECTRODE AND ELECTROCHEMICAL DEVICE INCLUDING THE SAME

(71) Applicant: NINGDE AMPEREX TECHNOLOGY LIMITED, Ningde (CN)

(72) Inventors: Huixin Wang, Ningde (CN); Silin Huang, Ningde (CN); Sheng Cheng, Ningde (CN); Hongming Yu, Ningde (CN)

(73) Assignee: DONGGUAN POWERAMP TECHNOLOGY LIMITED, Dongguan (CN)

( * ) Notice: Subject to any disclaimer, the term of this patent is extended or adjusted under 35 U.S.C. 154(b) by 116 days.

(21) Appl. No.: 16/534,191

(22) Filed: Aug. 7, 2019

(65) Prior Publication Data

US 2020/0313186 A1    Oct. 1, 2020

(30) Foreign Application Priority Data

Mar. 29, 2019  (CN) .......................... 201910251826.8

(51) Int. Cl.
*H01M 4/587* (2010.01)
*H01M 4/525* (2010.01)
(Continued)

(52) U.S. Cl.
CPC ........... *H01M 4/587* (2013.01); *H01M 4/364* (2013.01); *H01M 4/366* (2013.01); *H01M 4/386* (2013.01);
(Continued)

(58) Field of Classification Search
None
See application file for complete search history.

(56) References Cited

U.S. PATENT DOCUMENTS

| 7,081,142 B1 * | 7/2006 | Carlson | ............... H01M 50/414 |
| | | | 429/231.9 |
| 2009/0202903 A1 | 8/2009 | Chiang et al. | |

(Continued)

FOREIGN PATENT DOCUMENTS

| CN | 2758991 Y | 2/2006 |
| CN | 01662011 A | 3/2010 |

(Continued)

OTHER PUBLICATIONS

Office Action dated May 25, 2021, issued in counterpart CN Application No. 201910251826.8, with English Translation. (16 pages).

(Continued)

*Primary Examiner* — Amanda J Barrow
(74) *Attorney, Agent, or Firm* — WHDA, LLP

(57) ABSTRACT

A lithium secondary battery is disclosed which includes a cathode having a first cathode region and a second cathode region adjacent to the first cathode region, wherein the second cathode region is adjacent to an uncoated region of the cathode substrate; an anode, the anode having a first anode region and a second anode region adjacent to the first anode region, wherein the second anode region is adjacent to an uncoated region of the anode substrate, wherein a value $C_1$ is a ratio of a direct current resistance value $R_{A1}$ of the first anode region to a direct current resistance value $R_{C1}$ of the first cathode region; wherein a value $C_2$ is a ratio of a direct current resistance value $R_{A2}$ of the second anode region to a direct current resistance value $R_{C2}$ of the second cathode region; and wherein $C_2 < C_1$.

6 Claims, 3 Drawing Sheets

(51) Int. Cl.
*H01M 4/36* (2006.01)
*H01M 4/62* (2006.01)
*H01M 4/38* (2006.01)
*H01M 4/02* (2006.01)

(52) U.S. Cl.
CPC .......... *H01M 4/525* (2013.01); *H01M 4/625* (2013.01); *H01M 2004/021* (2013.01)

(56) References Cited

U.S. PATENT DOCUMENTS

| | | | |
|---|---|---|---|
| 2009/0305129 A1 | 12/2009 | Fukui et al. | |
| 2012/0308861 A1* | 12/2012 | Xing | H01M 4/1391 |
| | | | 429/94 |
| 2014/0248528 A1* | 9/2014 | Takahata | H01M 4/1393 |
| | | | 429/156 |
| 2015/0017522 A1* | 1/2015 | Miyatake | H01M 10/0525 |
| | | | 429/210 |
| 2015/0017527 A1 | 1/2015 | Lee et al. | |
| 2016/0093913 A1* | 3/2016 | Saito | H01M 10/0525 |
| | | | 429/246 |
| 2018/0233738 A1 | 8/2018 | Jung et al. | |
| 2018/0366786 A1* | 12/2018 | Fujii | H01M 50/572 |
| 2019/0123337 A1 | 4/2019 | Hasegawa | |
| 2021/0098793 A1* | 4/2021 | Date | H01M 4/661 |

FOREIGN PATENT DOCUMENTS

| | | | |
|---|---|---|---|
| CN | 102468475 A | 5/2012 | |
| CN | 102969480 A | 3/2013 | |
| CN | 103545559 A | 1/2014 | |
| CN | 104126242 A | 10/2014 | |
| CN | 104882611 A | 9/2015 | |
| CN | 103682242 B | 1/2018 | |
| CN | 108258193 * | 7/2018 | ........ H01M 10/0525 |
| CN | 108258193 A | 7/2018 | |
| CN | 108306052 A | 7/2018 | |
| CN | 108352506 A | 7/2018 | |
| CN | 109088091 A | 12/2018 | |
| CN | 109192925 A | 1/2019 | |
| CN | 109244362 A | 1/2019 | |
| JP | 2014-211944 A | 11/2014 | |
| JP | 2017216149 A | 12/2017 | |
| WO | 2011080901 A1 | 7/2011 | |
| WO | 2018079817 A1 | 5/2018 | |

OTHER PUBLICATIONS

First Office Action dated Apr. 22, 2020 in CN application 201910251838.0, 7, with English Translation. (Counterpart to U.S. Appl. No. 16/534,326) (14 pages).

"Expansion behavior of anode graphite in Li-ion battery," Chi et al., School of Food and Phamaceuticals, Suihua Univesity 2016, vol. 40, No. 1, 5 pages in Chinese with English abstract.

Third Office Action and Search Report dated Mar. 29, 2021 in CN application 201910251838.0, with English Translation. (Counterpart to U.S. Appl. No. 16/534,326) (13 pages).

Notification of Grant of Patent dated May 28, 2021 in CN application 201910251838.0, with English Translation. (Counterpart to U.S. Appl. No. 16/534,326) (3 pages).

Non-Final Office Action dated May 5, 2021, issued in U.S. Appl. No. 16/534,326 (12 pages).

Final Office Action dated Aug. 20, 2021, issued in U.S. Appl. No. 16/534,326 (15 pages).

First Office Action dated Apr. 27, 2020 in CN application 201910253064.5, with English translation. (Counterpart to U.S. Appl. No. 16/534,494) (17 pages).

Non-Final Office Action dated Aug. 6, 2021, issued in U.S. Appl. No. 16/534,494 (14 pages).

Final Office Action dated Dec. 3, 2021, issued in U.S. Appl. No. 16/534,494 (12 pages).

Non-Final Office Action dated May 27, 2022, issued in U.S. Appl. No. 16/534,494. (22 pages).

Final Office Action dated Oct. 31, 2022, issued in U.S. Appl. No. 16/534,494. (12 pages).

Non-Final Office Action dated May 10, 2022, issued in U.S. Appl. No. 16/534,326. (20 pages).

Final Office Action dated Aug. 16, 2022, issued in U.S. Appl. No. 16/534,326. (17 pages).

Advisory Action dated Oct. 28, 2022, issued in U.S. Appl. No. 16/534,326. (15 pages).

Merriam-Webster online definition of "partition" (Year: 2022).

* cited by examiner

ELECTRODE AND ELECTROCHEMICAL DEVICE INCLUDING THE SAME

CROSS REFERENCE TO RELATED APPLICATIONS

The present application claims the benefit of priority from the China Patent Application No. 201910251826.8, filed on 29 Mar. 2019, the disclosure of which is hereby incorporated by reference in its entirety.

BACKGROUND

1. Technical Field

The present application relates to the field of energy storage technologies, and more particularly to an electrode and an electrochemical device including the electrode.

2. Description of the Related Art

With the popularity of consumer electronics products, such as notebook computers, mobile phones, handheld game consoles, tablet computers, mobile power supplies and drones, the requirements for electrochemical devices (for example, batteries) have become ever more stringent. For example, people require not only light weight but also high capacity and long service life from batteries. Among the numerous types of batteries, lithium ion batteries have occupied an established position due to their outstanding advantages, such as high energy density, notable safety, low self-discharge, no memory effect, and long service life.

However, to date, the safety of the electrochemical devices has not been effectively guaranteed. For example, when a lithium-ion battery undergoes a long-term charge-discharge cycle, lithium is precipitated on the surface of an electrode of the lithium-ion battery, particularly the surface of an anode, forming lithium dendrites. The formation of lithium dendrites will largely break a separator between the anode and the cathode, causing the direct contact between the cathode and the anode to generate an electrochemical short circuit, thereby greatly reducing the safety of a cell. Therefore, improving the safety of electrochemical devices is an important research topic in the art.

SUMMARY

The present application provides an electrode, and a cell and an electrochemical device including the electrode in an attempt to solve at least one of the problems in the related art at least to some extent.

In one embodiment, the present application provides an anode, including a first anode region and a second anode region, wherein the anode includes an anode substrate and an anode active material on at least one surface of the anode substrate; and a direct current resistance value $R_{A2}$ of the second anode region is less than or equal to 98% of a direct current resistance value $R_{A1}$ of the first anode region.

In some embodiments, the first anode region includes a body region of the anode, and the second anode region includes an edge region of the anode.

In some embodiments, a thickness of the second anode region is less than a thickness of the first anode region.

In some embodiments, the median particle diameter Dv50 of the anode active material of the first anode region is greater than the Dv50 of the anode active material of the second anode region.

In some embodiments, the anode active material of the first anode region includes graphite, and the anode active material of the second anode region includes hard carbon.

In some embodiments, the anode active material of the first anode region includes Si, and the anode active material of the second anode region includes a mixture of graphite and hard carbon.

In some embodiments, the anode further includes conductive carbon, wherein the content of the conductive carbon in the first anode region is less than the content of the conductive carbon in the second anode region.

In some embodiments, the conductivity of the substrate of the first anode region is inferior to the conductivity of the substrate of the second anode region.

In some embodiments, the substrate of the first anode region includes an undercoat layer coating a surface thereof, wherein the conductivity of the undercoat layer of the first anode region is inferior to the conductivity of an undercoat layer of the second anode region.

In some embodiments, the anode further includes a third anode region, wherein a direct current resistance value $R_{A3}$ of the third anode region is less than or equal to the direct current resistance value $R_{A2}$ of the second anode region.

In some embodiments, the thickness of the anode of the third anode region is less than the thickness of the anode of the second anode region.

In some embodiments, the third anode region is disposed to be adjacent to the second anode region but away from the first anode region.

In some embodiments, the anode further includes a fourth anode region, wherein the fourth anode region includes an insulation material, and wherein the insulation material includes ceramic.

In some embodiments, the fourth anode region is disposed at an edge of the anode substrate.

In one embodiment, the present application provides a cathode, including a first cathode region and a second cathode region, wherein the cathode includes a cathode substrate and a cathode active material on at least one surface of the cathode substrate, and wherein a direct current resistance value $R_{C2}$ of the second cathode region is greater than a direct current resistance value $R_{C1}$ of the first cathode region.

In some embodiments, the first cathode region includes a cathode body region, and the second cathode region includes a cathode edge region.

In some embodiments, the thickness of the cathode of the second cathode region is less than the thickness of the cathode of the first cathode region.

In some embodiments, the cathode active material of the first cathode region includes polycrystal particles, and the cathode active material of the second cathode region includes monocrystal particles. In the above embodiments, the cathode active material includes a ternary material.

In some embodiments, the Dv50 of the cathode active material of the first cathode region is less than the Dv50 of the cathode active material of the second cathode region.

In some embodiments, the cathode active material includes a carbon-coated active material, wherein the carbon coating amount of the active material of the first cathode region is greater than the carbon coating amount of the active material of the second cathode region.

In some embodiments, the cathode active material of the first cathode region includes a ternary material, and the cathode active material of the second cathode region includes lithium cobalt oxide.

In some embodiments, a cathode material further includes conductive carbon, wherein the content of the conductive carbon in the cathode material in the first anode region is greater than the content of the conductive carbon in the cathode material in the second anode region.

In some embodiments, the conductivity of the substrate of the first cathode region is superior to the conductivity of the substrate of the second cathode region.

In some embodiments, the cathode further includes a third cathode region, wherein a direct current resistance value $R_{C3}$ of the third cathode region is greater than or equal to the direct current resistance value $R_{C2}$ of the second cathode region.

In some embodiments, the thickness of the cathode of the third cathode region is less than the thickness of the cathode of the second cathode region.

In some embodiments, the third cathode region is disposed to be adjacent to the second cathode region but away from the first cathode region.

In some embodiments, the cathode further includes a fourth cathode region, wherein the fourth cathode region includes an insulation material, and wherein the insulation material includes ceramic.

In some embodiments, the fourth cathode region is disposed at an edge of the cathode substrate.

In one embodiment, the present application provides a cell, including: a cathode, the cathode including a first cathode region and a second cathode region; and an anode, the anode including a first anode region and a second anode region; wherein a value $C_1$ of the first region includes a ratio of a direct current resistance value $R_{A1}$ of the first anode region to a direct current resistance value $R_{C1}$ of the first cathode region, and a value $C_2$ of the second region includes a ratio of a direct current resistance value $R_{A2}$ of the second anode region to a direct current resistance value $R_{C2}$ of the second cathode region, and wherein $C_2 < C_1$.

In some embodiments, the anode in the cell is the anode in the above embodiments.

In some embodiments, the cathode in the cell is the cathode in the above embodiments.

In some embodiments, the anode in the cell further includes the third anode region and/or the fourth anode region in the above embodiments.

In some embodiments, the cathode in the cell further includes the third cathode region and/or the fourth cathode region in the above embodiments.

By setting different resistances in different regions of the electrodes of the cell, the present application solves the problem of uneven deposition of lithium in different regions of the electrodes of the cell, and reduces the probability of formation of lithium dendrites and the possibility of electrochemical short circuit, thereby greatly enhancing the safety of the cell. Additional aspects and advantages of the embodiments of the present application will be described or shown in the following description or interpreted by implementing the embodiments of the present application.

BRIEF DESCRIPTION OF THE DRAWINGS

The following will briefly illustrate the accompanying drawings necessary to describe the embodiments of the present application or the existing technology so as to facilitate the description of the embodiments of the present application. Obviously, the accompanying drawings described below are only part of the embodiments of the present application. For a person skilled in the art, the accompanying drawings of other embodiments can still be obtained according to the structures illustrated in the accompanying drawings without any creative effort.

Figure 1:
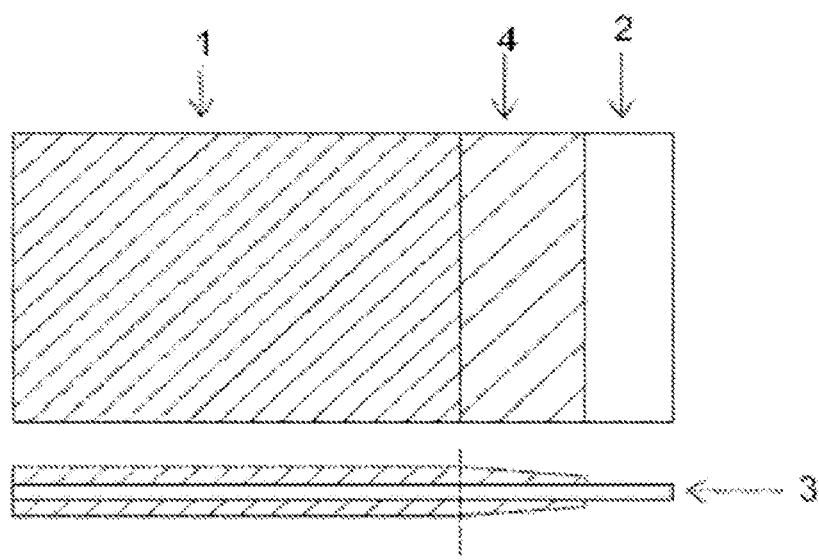
FIG. 1 shows the structure of a common electrode in the prior art.

With respect to the meanings of the reference numerals in FIGS. 1-3, the present application describes as follows:

Reference numeral 1 denotes a body region;

Reference numeral 2 denotes an empty foil region;

Reference numeral 3 denotes a substrate;

Reference numeral 4 denotes an edge thin region;

Reference numeral 5 denotes an edge region;

Reference numeral 6 denotes a third region (third anode region or third cathode region); and Reference numeral 7 denotes a fourth region (fourth anode region or fourth cathode region).

PREFERRED EMBODIMENT OF THE PRESENT APPLICATION

Embodiments of the present application are described in detail below. Throughout the specification, the same or similar components and components having the same or similar functions are denoted by similar reference numerals. The embodiments described herein with respect to the accompanying drawings are illustrative and graphical, and are used for providing a basic understanding of the present application. The embodiments of the present application should not be construed as limiting the present application.

As used herein, the terms "substantially", "generally", "essentially" and "about" are used to describe and explain small variations. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if the difference value between the two values is less than or equal to ±10% of the average of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), then the two values can be considered "substantially" the same.

In addition, amounts, ratios and other numerical values are sometimes presented herein in a range format. It should be appreciated that such range formats are for convenience and conciseness, and should be flexibly understood as including not only values explicitly specified to range constraints, but also all individual values or sub-ranges within the ranges, like explicitly specifying each value and each sub-range.

The term "body region" is a region coated with a main electrode active material or a main region coated with an electrode active material. For example, in some embodiments of the present application, different electrode active materials A and B respectively coat different regions of the electrode, wherein the electrode active material A is the main electrode active material, and then the region coated with the active material A is the body region. For another example, in some embodiments of the present application, the same electrode active material coats different regions C and D of the electrode, wherein the area of the region C is large, and then the region C is the body region.

The term "edge region" is a region that is a few millimeters to tens of millimeters (e.g., about 3 mm to about 40 mm) from an edge of the body region. In some embodiments of the present application, the edge region may be, but not limited to, a region that is about 30 mm from the edge of the body region, a region that is about 20 mm from the edge of the body region, a region that is about 10 mm from the edge of the body region, or a region that is about 5 mm from the edge of the body region.

Taking lithium-ion batteries as an example, electrodes currently used in lithium-ion batteries have various structural categories, such as a multi-tab wound structure (MTW), a full-tab wound structure (FTW), a stack structure and the like. Generally, an electrode of a lithium-ion battery includes a substrate (also referred to as a current collector) and an electrode active material on at least one surface of the substrate, wherein most of the substrates are metal materials to function to transmit electrons, and the electrode active material is capable of converting chemical energy into electrical energy.

FIG. 1 shows the structure of a common electrode in the prior art. As shown in FIG. 1, in a process of preparing an electrode, in the prior art, the electrode is generally divided into a body region 1 (also referred to as an active material region), an edge thin region 4 and an empty foil region 2 (also referred to as a tab region), wherein the surfaces of the body region 1 and the edge thin region 4 are coated with the same electrode active material, but the thickness of the electrode active material of the edge thin region 4 is generally less than the thickness of the electrode active material of the body region 1, and the empty foil region is a region that is a few millimeters to tens of millimeters from an edge of the substrate 3 without being coated with any electrode active material, so as to attach a tab, or so that the empty foil region itself serves as a tab.

The active material region in the electrode is generally not partitioned in the prior art. When the active material region is coated with the electrode active material, since most of the slurry exhibits a liquid state and has fluidity, it results in that, as compared to the active material region, the empty foil region has less electrode active material and thus is thinner to form the edge thin region 4.

Compared with the body region 1, the edge thin region 4 has a thinner layer of the electrode active material, and thus intercalation and deintercalation of lithium ions would more easily occur. Accordingly, the resistance of the thin region of the electrode is less than that of the body region, no matter whether the electrode is used as an anode or a cathode.

However, for the anode in the prior art, the extent to which the resistance of the thin region is less than the resistance of the body region is insufficient. Specifically, as compared with the body region, when a cathode per unit area releases the same amount of lithium ions, although the active material of the anode thin region per unit area can intercalate lithium ions relatively quickly, active sites in which the lithium ions can be intercalated in the anode thin region per unit area are fewer, so the anode thin region per unit area cannot completely absorb these lithium ions in a short time as the body region, thereby causing a part of the lithium ions to "accumulate" on the surface of the anode thin region.

Besides, for the cathode in the prior art, the resistance of the thin region is less than the resistance of the body region, which enables the cathode thin region to release lithium ions more quickly. Therefore, compared with the body region, the anode thin region "faces" a large amount of lithium ions in a short time and cannot quickly absorb them, which also causes a part of lithium ions to "accumulate" on the surface of the anode thin region. In this case, these lithium ions are deposited on the surface of the anode thin region to form lithium dendrites. The formation of the lithium dendrites will largely break a separator, causing the direct contact between the cathode and the anode and thus an electrochemical short circuit, thereby greatly reducing the safety of the cell.

In order to at least overcome the above disadvantages, the present application provides a partitioned anode, a partitioned cathode and a cell. Specifically, the present application proposes to divide the anode and/or the cathode into a plurality of regions and perform differential coating, and the extent of lithium deposition of the electrochemical device during charge and discharge can be alleviated by adjusting the kinetic performance of different regions, thereby enhancing the safety of the electrochemical device. The present application uses the parameter "direct current resistance" to measure the kinetic performance of the electrode.

Figure 2:
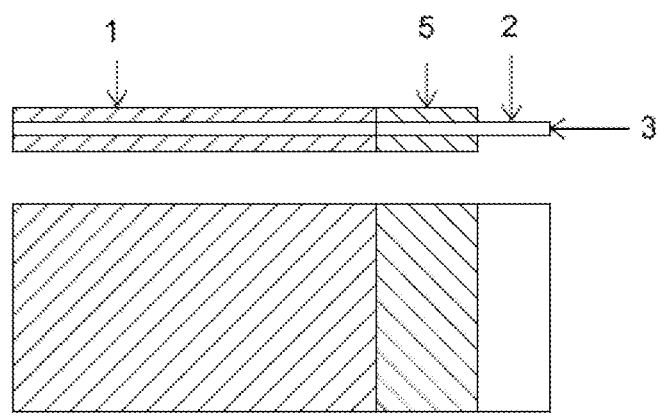
FIG. 2 shows a structural schematic diagram of a partitioned electrode in some embodiments of the present application.
Figure 3:
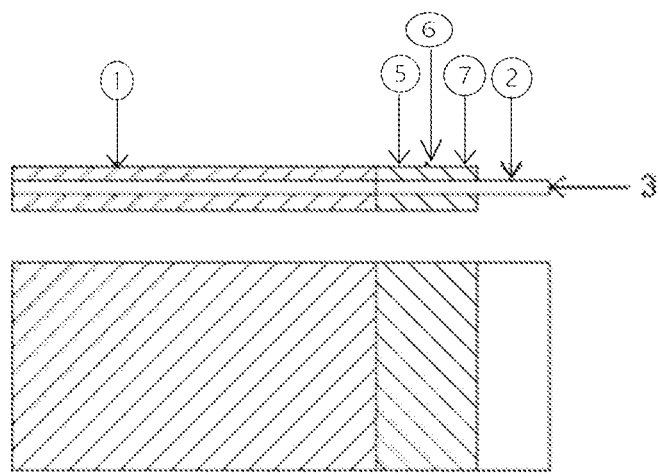
FIG. 3 shows a structural schematic diagram of a partitioned electrode in some embodiments of the present application.

FIG. 2 shows a schematic structural view of a partitioned electrode (partitioned anode or partitioned cathode as described in detail below) in some embodiments of the present application. As shown in FIG. 2, in some embodiments of the present application, the electrode includes a substrate and an electrode active material coating on at least one surface of the substrate, wherein the electrode includes a first region (e.g., the body region) and a second region (e.g., the edge region), and the above object can be achieved by adjusting the direct current resistances of the first region and the second region. It should be noted that, FIG. 2 is only a schematic structural view of an electrode drawn to facilitate a person skilled in the art to better understand the technical solutions described in the present application, and the electrode described in the present application is not identical in any detail to that shown in FIG. 2. For example, the thickness of an edge region 5 in FIG. 2 seems the same as the thickness of the body region 1, but it actually does not require the thicknesses of the above two regions to be the same in the electrode described in the present application.

I. Anode

One embodiment of the present application provides an anode, the anode including a first anode region and a second anode region, wherein the anode includes an anode substrate and an anode active material on at least one surface of the anode substrate; and wherein a direct current resistance value $R_{A2}$ of the second anode region is less than or equal to about 98% of a direct current resistance value $R_{A1}$ of the first anode region. In some embodiments, the first anode region includes an anode body region, and the second anode region includes an anode edge region. In some embodiments, the thickness of the anode of the second anode region is less than the thickness of the anode of the first anode region.

By adjusting the direct current resistance value $R_{A2}$ of the anode thin region to be less than or equal to about 98% of the direct current resistance value $R_{A1}$ of the anode body region, the anode thin region per unit area can intercalate lithium ions more quickly than the anode body region per unit area. This alleviates the accumulation of lithium ions on the surface of the anode thin region to some extent. Accordingly, the probability of formation of lithium dendrites on the surface of the anode thin region is greatly reduced, thereby enhancing the safety of a cell.

In some embodiments of the present application, the direct current resistance value $R_{A2}$ of the second anode region is less than or equal to about 95%, about 90%, about 85%, about 80%, about 75%, about 70%, about 65%, about 60%, about 55% or about 50% of the direct current resistance value $R_{A1}$ of the first anode region.

In some embodiments of the present application, the kinetic performance of the anode thin region can be improved by adjusting the particle diameter of the anode active material, the kinds of the anode active material, the content of the conductive agent in the anode, the conductivity of the anode substrate and the conductivity of the undercoat layer on the anode substrate.

(I) Particle Diameter of Anode Active Material

In the present application, the median particle diameter Dv50 is used to measure the particle diameter of the electrode active material. The median particle diameter Dv50 is a particle diameter value of material particles at 50% in a cumulative distribution curve (the cumulative distribution curve shows the particle size from the smallest particle to the largest particle). When the anode active material is used to coat the anode substrate, lithium ions are more easily intercalated in the material particles having a smaller median particle diameter Dv50 than material particles having a larger median particle diameter Dv50. Therefore, the region coated with an electrode active material having a smaller particle diameter is more convenient for the movement of lithium ions inside the electrode material than a region coated with an electrode active material having a larger particle diameter, and thus exhibits a better kinetic performance.

In some embodiments of the present application, in order to further enhance the kinetic performance of the anode thin region, an anode active material having a smaller median particle diameter Dv50 may be adopted to coat the anode thin region, and an anode active material having a larger median particle diameter Dv50 may be adopted to coat the anode body region. In some embodiments of the present application, the median particle diameter Dv50 of the anode active material of the body region and/or the thin region may be in the range of about 2 μm to about 40 μm, in the range of about 4 μm to about 30 μm or in the range of about 8 μm to about 18 μm.

(II) Species of Anode Active Materials

The anode active material layer of the lithium ion battery includes an anode material capable of absorbing and releasing lithium (Li) (hereinafter, sometimes referred to as "an anode material capable of absorbing/releasing lithium Li"). The anode material capable of absorbing/releasing lithium (Li) may include, but not limited to, a carbon material, a metal compound, an oxide, a sulfide, a nitride of lithium such as $LiN_3$, a lithium metal, and a metal which forms an alloy with lithium and a polymer material.

The carbon material may include, but not limited to, low graphitized carbon, easily graphitized carbon, artificial graphite, natural graphite, mesocarbon microbeads, soft carbon, hard carbon, pyrolytic carbon, coke, vitreous carbon, an organic polymer-compound sintered body, carbon fiber and activated carbon. The coke can include pitch coke, needle coke and petroleum coke. The organic polymer-compound sintered body refers to a material obtained by calcining a polymer material (for example, phenol plastic or furan resin) at a suitable temperature and carbonizing the same. These materials can be classified into low graphitized carbon or easily graphitized carbon. The polymer material can include, but not limited to, polyacetylene and polypyrrole.

Further, in these anode materials capable of absorbing/releasing lithium (Li), the materials of which the charging and discharging voltages are close to the charging and discharging voltages of lithium metal are selected. This is because if the charging and discharging voltages of the anode material are lower, the lithium ion battery has higher energy density more easily. Carbon materials can be selected as the anode material because their crystal structures are only slightly changed upon charging and discharging, so good cycle characteristics and large charging and discharging capacities can be obtained. In particular, graphite may be selected because it can provide a large electrochemical equivalent and a high energy density.

Further, the anode material capable of absorbing/releasing lithium (Li) can include elemental lithium metals, metal elements and semi-metal elements capable of forming alloys together with lithium (Li), alloys and compounds including such elements, etc. In particular, the above materials are used together with the carbon material since in such case, good cycle characteristics as well as high energy density can be obtained. In addition to the alloys including two or more metal elements, the alloys used here also include alloys including one or more metal elements and one or more semi-metal elements. The alloy may be in one or more of the following states: a solid solution, a eutectic crystal (eutectic mixture), an intermetallic compound, and a mixture thereof.

Examples of the metal elements and the semi-metal elements can include stannum (Sn), plumbum (Pb), aluminum (Al), indium (In), silicon (Si), zinc (Zn), stibium (Sb), bismuth (Bi), cadmium (Cd), magnesium (Mg), boron (B), gallium (Ga), germanium (Ge), arsenic (As), silver (Ag), zirconium (Zr), yttrium (Y) or hafnium (Hf). Examples of the above alloys and compounds may include a material having a chemical formula: $Ma_sMb_tLi_u$ and a material having a chemical formula: $Ma_pMc_qMd_r$. In these chemical formulas, Ma denotes at least one of the metal elements and the semi-metal elements capable of forming an alloy together with lithium; Mb denotes at least one of the metal elements and the semi-metal elements except lithium and Ma; Mc denotes at least one of non-metal elements; Md denotes at least one of the metal elements and the semi-metal elements except Ma; and s, t, u, p, q and r satisfy $s>0$, $t≥0$, $u≥0$, $p>0$, $q>0$ and $r≥0$.

In addition, an inorganic compound not including lithium (Li), such as $MnO_2$, $V_2O_5$, $V_6O_{13}$, NiS and MoS, may be used in the anode.

In some embodiments of the present application, a corresponding anode active material may be selected to coat the first anode region or the second anode region based on the difference in kinetic performance of the anode active material per se. For example, as compared to the first anode region, an anode active material having a better kinetic performance may be coated on the second anode region. In some embodiments of the present application, since hard carbon has a better kinetic performance than graphite, it can coat the first anode region with graphite and coat the second anode region with hard carbon. In some embodiments of the present application, since graphite and hard carbon have a better kinetic performance than Si and Sn, it can coat the first anode region with Si, Sn or a mixture thereof, and coat the second anode region with graphite, hard carbon or a mixture thereof.

(III) Content of Conductive Agent in Anode

In some embodiments of the present application, the anode further includes a conductive agent, wherein the conductive agent is used to enhance the conductivity of the anode active material. In some embodiments, the conductive agent includes conductive carbon, and the conductive carbon includes one or more of conductive carbon black, carbon fibers, Ketjen black, acetylene black, carbon nanotubes and graphene. In some embodiments of the present application, in order to further enhance the kinetic performance of the second anode region, more conductive carbon may be added to the second anode region than to the first anode region.

(IV) Conductivity of Anode Substrate

In some embodiments of the present application, in order to further enhance the kinetic performance of the second anode region, a substrate having a better conductivity may be used in the second anode region than in the first anode region. In some embodiments of the present application, the anode substrate may be, but not limited to, copper foil or nickel foil.

(V) Undercoat Layer on Anode Substrate

In some embodiments of the present application, the anode further includes an undercoat layer, and the undercoat layer is located between the anode active material layer and the anode substrate. In some embodiments, the undercoat layer includes one or more of conductive carbon black, carbon fibers, Ketjen black, acetylene black, carbon nanotubes and graphene. In some embodiments of the present application, in order to further enhance the kinetic performance of the second anode region, an undercoat layer having a better conductivity may be used in the second anode region than in the first anode region.

In some embodiments of the present application, the anode further includes a third anode region, wherein a direct current resistance value $R_{A3}$ of the third anode region is less than or equal to the direct current resistance value $R_{A2}$ of the second anode region. The principle of arranging the third anode region is similar to that of the second anode region, both of them for further enhancing the kinetic performance of the anode thin region.

In some embodiments of the present application, the third anode region is disposed to be adjacent to the second anode region but away from the first anode region. In some embodiments of the present application, the thickness of the anode of the third anode region is less than or equal to the thickness of the anode of the second anode region.

In some embodiments of the present application, the first anode region includes an anode body region, the second anode region includes a first anode edge region, and the third anode region includes a second anode edge region, wherein the second anode edge region is adjacent to the first anode edge region but away from the anode body region.

In some embodiments of the present application, the anode further includes an insulation region, and the insulation region is disposed at an edge of the substrate for the function of insulation, so as to prevent a short circuit between the anode and the cathode. In some embodiments, the insulation region includes ceramic, wherein the unit area capacity of the ceramic is 0.

II. Cathode

One embodiment of the present application provides a cathode including a first cathode region and a second cathode region, wherein the cathode includes a cathode substrate and a cathode active material on at least one surface of the cathode substrate; and wherein a direct current resistance value $R_{C2}$ of the second cathode region is greater than a direct current resistance value $R_{C1}$ of the first cathode region. In some embodiments, the first cathode region includes the cathode body region, and the second cathode region includes a cathode edge region. In some embodiments, the thickness of the cathode of the second cathode region is less than the thickness of the cathode of the first cathode region.

By adjusting the direct current resistance value $R_{C2}$ of the cathode thin region to be greater than the direct current resistance value $R_{C1}$ of the cathode body region, the cathode thin region per unit area can deintercalate lithium ions slowly than the cathode body region per unit area. It alleviates the accumulation extent of lithium ions from the cathode on the surface of the anode thin region to some extent. Accordingly, the probability of formation of lithium dendrites on the surface of the anode thin region is greatly reduced, thereby enhancing the safety of the cell.

In some embodiments of the present application, the kinetic performance of the cathode thin region can be weakened by adjusting the particle diameter of the cathode active material, the kinds of the cathode active material, the crystal structure of the cathode active material, the content of the conductive agent in the cathode, the conductivity of the cathode substrate, and the conductivity of the undercoat layer on the cathode substrate.

(I) Particle Diameter of Cathode Active Material

In some embodiments of the present application, in order to weaken the kinetic performance of the cathode thin region, a cathode active material having a smaller median particle diameter Dv50 may be adopted to coat the cathode body region, and a cathode active material having a larger median particle diameter Dv50 may be adopted to coat the cathode thin region. In some embodiments of the present application, the median particle diameter Dv50 of the cathode active material of the body region and/or the thin region may be in the range of about 2 μm to about 40 μm, in the range of about 4 μm to about 30 μm or in the range of about 8 μm to about 18 μm.

(II) Species of Cathode Active Material

The cathode active material layer of the lithium ion battery includes a cathode material capable of absorbing and releasing lithium (Li) (hereinafter, sometimes referred to as "a cathode material capable of absorbing/releasing lithium Li"). Examples of the cathode material capable of absorbing/releasing lithium (Li) may include, but not limited to, lithium cobalt oxide, a ternary material, lithium manganate, lithium manganese iron phosphate, lithium vanadium phosphate, oxylithium vanadium phosphate, lithium iron phosphate, lithium titanate and a lithium-containing manganese-based material.

In the above cathode material, the chemical formula of lithium cobalt oxide can be, but not limited to, $Li_xCo_aM1_bO_{2-c}H_d$, wherein M1 is selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), yttrium (Y), lanthanum (La), zirconium (Zr), silicon (Si), and combinations thereof, wherein H is selected from the group consisting of fluorine (F), sulfur (S), boron (B), nitrogen (N) or phosphorus (P), and combinations thereof, and the values of x, a, b, c and d are respectively in the following ranges: $0.8 \leq x \leq 1.2$, $0.8 \leq a \leq 1$, $0 \leq b \leq 0.2$, $-0.1 \leq c \leq 0.2$ and $0 \leq d \leq 0.2$.

In the above cathode material, the ternary material refers to a material capable of reversibly intercalating and deintercalating lithium ions, which is composed of lithium, three different metal elements other than lithium, and oxygen. In some embodiments, the chemical formula of the ternary material may be $Li_yM2_eM3_fM4_gO_{2-h}$, wherein M2-M4 are selected from the group consisting of nickel (Ni), cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W), zirconium (Zr), silicon (Si) and combinations thereof, and the values of y, e, f, g and h are respectively in the following ranges: $0.8 \leq y \leq 1.2$, $0.3 \leq e \leq 0.98$, $0.02 \leq f \leq 0.7$, $0.02 \leq g \leq 0.7$, and $-0.1 \leq h \leq 0.2$. In some embodiments of the present application, the ternary material includes lithium nickel cobalt manganese oxide and/or lithium nickel cobalt aluminum oxide.

In the above cathode material, the chemical formula of lithium manganate is $Li_zMn_{2-p}M5_pO_{4-r}$, wherein M5 represents the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), tungsten (W) and combinations thereof, and the values of z, p and r are respectively in the following ranges: $0.8 \leq z \leq 1.2$, $0 \leq p < 1.0$ and $-0.2 \leq r \leq 0.2$.

In some embodiments of the present application, a corresponding cathode active material may be selected based on their difference in kinetic performance to coat the first cathode region or the second cathode region. For example, as compared to the first cathode region, a cathode active material having a slightly worse kinetic performance may be coated on the second cathode region. In some embodiments of the present application, a cathode material including a ternary material may be coated on the first cathode region, and a cathode material including lithium cobalt oxide may be coated on the second cathode region, wherein the ternary material has a better kinetic performance than the lithium cobalt oxide.

Since the structure and electrochemical performance of the cathode active material can be improved by measures such as doping and/or coating, for the same kind of cathode active material, the kinetic performance of the cathode active material can be adjusted by adjusting the kind or content of the doped and/or coated element or substance. For example, since a carbon material has a good conductivity, the cathode active material may be coated with the carbon material. In order to weaken the kinetic performance of the cathode thin region, as compared with the active material of the cathode body region, a small amount of carbon may coat the active material of the cathode thin region. In some embodiments of the present application, the cathode active material includes, but not limited to, the above cathode material capable of absorbing/releasing lithium (Li).

(III) Crystal Structure of Cathode Active Material

In some embodiments of the present application, a cathode active material including polycrystal particles may be coated on the first cathode region and a cathode active material including monocrystal particles may be coated on the second cathode region, wherein the polycrystal particles refer to secondary particles which are formed by tightly bonding hundreds or thousands of primary nanoparticles, and the monocrystal particles refer to secondary particles which are formed by stacking several to several tens of primary microparticles. Since the polycrystal particles are composed of nanoparticles and the monocrystal particles are composed of microparticles, as compared to the monocrystal particles, the polycrystal particles have a shorter lithium ion bulk phase diffusion path and thus have a smaller resistance and a better kinetic performance monocrystal. In some embodiments of the present application, the cathode active material includes, but is not limited to, the cathode material described above capable of absorbing/releasing lithium (Li). For example, the cathode active material includes, but is not limited to, a ternary material.

(IV) Content of Conductive Agent in Cathode

In some embodiments of the present application, the cathode further includes a conductive agent, wherein the conductive agent is used to enhance the conductivity of the cathode active material. In some embodiments, the conductive agent includes conductive carbon, and the conductive carbon includes one or more of conductive carbon black, carbon fibers, Ketjen black, acetylene black, carbon nanotubes and graphene. In some embodiments of the present application, in order to weaken the kinetic performance of the cathode thin region, a smaller amount of conductive carbon may be added to the cathode thin region than in the cathode body region.

(V) Conductivity of Cathode Substrate

In some embodiments of the present application, in order to weaken the kinetic performance of the cathode thin region, a substrate having a lower conductivity may be used in the second cathode region than in the first cathode region. In some embodiments of the present application, the cathode substrate may be, but is not limited to, aluminum foil or nickel foil.

(VI) Undercoat Layer on Cathode Substrate

In some embodiments of the present application, the cathode further includes an undercoat layer, and the undercoat layer is located between the cathode active material layer and the cathode substrate. In some embodiments, the undercoat layer includes one or more of conductive carbon black, carbon fibers, Ketjen black, acetylene black, carbon nanotubes and graphene. In some embodiments of the present application, in order to weaken the kinetic performance of the cathode thin region, an undercoat layer having a lower conductivity may be used in the cathode thin region than in the cathode body region.

In some embodiments of the present application, the cathode further includes a third cathode region, wherein the direct current resistance value $R_{C3}$ of the third cathode region is greater than or equal to the direct current resistance value $R_{C2}$ of the second cathode region. The principle of arranging the third cathode region is similar to that of the second cathode region, both of them for the function of weakening the kinetic performance of the cathode thin region.

In some embodiments of the present application, the third cathode region is disposed adjacent to the second cathode region but away from the first cathode region. In some embodiments of the present application, the thickness of the cathode of the third cathode region is less than or equal to the thickness of the cathode of the second cathode region.

In some embodiments of the present application, the first cathode region includes a cathode body region, the second cathode region includes a first cathode edge region, and the third cathode region includes a second cathode edge region, wherein the second cathode edge region is adjacent to the first cathode edge region but away from the cathode body region.

In some embodiments of the present application, the cathode further includes an insulation region disposed at the edge of the substrate to function as an insulation to prevent a short circuit between the anode and the cathode. In some embodiments, the insulation region includes ceramic, wherein the unit area capacity of the ceramic is 0.

III. Cell and Electrochemical Device

One embodiment of the present application further provides a cell. The cell includes a cathode and an anode, wherein the cathode includes a first cathode region and a second cathode region, and wherein the anode includes a first anode region and a second anode region. In the present application, the ratio of a direct current resistance value $R_A$ of the anode to a direct current resistance value $R_C$ of the cathode is defined as a value C. In order to enhance the kinetic performance of an anode thin region or in order to weaken the kinetic performance of a cathode thin region, the present application proposes that the value C of the thin region is less than the value C of the thick region.

Specifically, in the cell of the present application, the ratio of a direct current resistance value $R_{A1}$ of the first anode region to a direct current resistance value $R_{C1}$ of the first cathode region is defined as the value $C_1$ of the first region, and the ratio of a direct current resistance value $R_{A2}$ of the second anode region to a direct current resistance value $R_{C2}$ of the second cathode region is defined as the value $C_2$ of the second region, and wherein $C_2<C_1$.

In some embodiments of the present application, the cell of the present application includes at least one of the cathode described in the embodiments of the present application and the anode described in the embodiments of the present application. The structure and composition of the specific cathode and anode are described above, and are not described herein again.

In some embodiments of the present application, the anode in the cell further includes the third anode region and/or the insulation region in the above embodiments. In some embodiments, the cathode in the cell further includes the third cathode region and/or the insulation region in the above embodiments.

In some embodiments of the present application, when the anode of the cell includes the third anode region and the cathode of the cell includes the third cathode region, the ratio of the direct current resistance value $R_{A3}$ of the third anode region to a direct current resistance value $R_{C3}$ of the third cathode region is further defined as the value $C_3$ of the third region, wherein the relationship among $C_1$, $C_2$ and $C_3$ meets $C_3<C_2<C_1$.

One embodiment of the present application further proposes an electrochemical device, including the cell described in the embodiments of the present application. In some embodiments, the electrochemical device includes a lithium ion battery.

In some embodiments, the cell in the lithium ion battery further includes an electrolyte. The state of the electrolyte may be one or more of a gel state, a solid state and a liquid state. The liquid electrolyte includes a lithium salt and a non-aqueous solvent.

The lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, LiBOB and $LiPO_2F_2$. For example, $LiPF_6$ is selected as the lithium salt because it can provide a high ionic conductivity and improve cycle characteristics.

The non-aqueous solvent can be a carbonate compound, a carboxylate compound, an ether compound, an acrylic compound, other organic solvent or a combination thereof.

Examples of the carbonate compound are diethyl carbonate (DEC), dimethyl carbonate (DMC), dipropyl carbonate (DPC), methyl propyl carbonate (MPC), ethyl propyl carbonate (EPC), methyl ethyl carbonate (MEC), ethylene carbonate (EC), propylene carbonate (PC), butylene carbonate (BC), vinyl ethylene carbonate (VEC), fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, and combinations thereof.

In some embodiments, based on the total weight of the electrolyte, the content of the carbonate compound is about 1 wt % or above. In some embodiments, the content of the carbonate compound is about 3 wt % or above. In some embodiments, the content of the carbonate compound is about 5 wt % or above. In some embodiments, the content of the carbonate compound is about 10 wt % or above. In some embodiments, the content of the carbonate compound is about 50 wt % or above. In some embodiments, the content of the carbonate compound is about 58 wt % or above. In some embodiments, the content of the carbonate compound is about 60 wt % or below. In some embodiments, the content of the carbonate compound is about 50 wt % or below. In some embodiments, the content of the cyclic carbonate compound is about 40 wt % or below. In some embodiments, the content of the carbonate compound is about 1 wt % to about 60 wt %. In some embodiments, the content of the carbonate compound is about 3 wt % to about 50 wt %.

Examples of the carboxylate compound are methyl acetate, ethyl acetate, n-propyl acetate, t-butyl acetate, methyl propionate, ethyl propionate, propyl propionate, gamma-butyrolactone, decalactone, valerolactone, mevalonolactone, caprolactone, and combinations thereof.

In some embodiments, based on the total weight of the electrolyte, the content of the carboxylate compound is about 1 wt % or above. In some embodiments, the content of the carboxylate compound is about 3 wt % or above. In some embodiments, the content of the carboxylate compound is about 5 wt % or above. In some embodiments, the content of the carboxylate compound is about 10 wt % or above. In some embodiments, the content of the carboxylate compound is about 60 wt % or below. In some embodiments, the content of the carboxylate compound is about 50 wt % or below. In some embodiments, the content of the carboxylate compound is about 40 wt % or below. In some embodiments, the content of the carboxylate compound is about 1 wt % to about 60 wt %. In some embodiments, the content of the carboxylate compound is about 3 wt % to about 50 wt %.

Examples of the ether compound are tetrahydrofuran, 2-methyltetrahydrofuran, 1,3-dioxolane, 2-methyl 1,3-dioxolane, 4-methyl 1,3-dioxolane, 1,3-dioxane, 1,4-dioxane, dimethoxypropane, dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, 1,2-ethoxymethoxyethane, $HCF_2CF_2CH_2OCF_2CF_2H$, $(CF_3)_2CFCF$ $(CF_2CF_3)(OCH_3)$, $CF_3CHFCF_2CH(CH_3)OCF_2CHFCF_3$, $HCF_2CF_2CH_2OCF_2CF_2CF_2CF_2H$, $HCF_2CF_2OCH_2CF_3$, $HCF_2CF_2OCH_2CH_2OCF_2CF_2H$, $HCF_2CF_2OCH_2CH_2CH_2OCF_2CF_2H$ and combinations thereof.

In some embodiments, based on the total weight of the electrolyte, the content of the ether compound is about 0.01 wt % or above. In some embodiments, the content of the ether compound is about 0.05 wt % or above. In some embodiments, the content of the ether compound is about 1 wt % or above. In some embodiments, the content of the ether compound is about 2 wt % or above. In some embodiments, the content of the ether compound is about 10 wt % or below. In some embodiments, the content of the ether compound is about 6 wt % or below. In some embodiments, the content of the ether compound is about 5 wt % or below. In some embodiments, the content of the ether compound is about 0.01 wt % to about 10 wt %. In some embodiments, the content of the ether compound is about 1 wt % to about 6 wt %.

Examples of the nitrile compound are succinonitrile, glutaronitrile, adiponitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylsuccinonitrile, 2-methylglutaronitrile, 2,4-dimethylglutaronitrile, 2,2,4,4-tetramethylglutaronitrile, 1,4-dicyanopentane, 1,4-dicyanopentane, 2,5-dimethyl-2,5-hexanedicarbonitrile, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,5-dioxa-pimelic nitrile, 1,4-bis(cyanoethoxy)butane, ethylene glycol bis(2-cyanoethyl)ether, diethylene glycol bis(2-cyanoethyl)ether, triethylene glycol bis(2-cyanoethyl)ether, tetraethylene glycol bis(2-cyanoethyl)ether, 3,6,9,12,15,18-hexaoxaeicosanoic acid dinitrile, 1,3-bis(2-cyanoethoxy)propane, 1,4-bis(2-cyanoethoxy)butane, 1,5-bis(2-cyanoethoxy)pentane, ethylene glycol bis(4-cyanobutyl)ether, 1,3,5-pentanetricarbonitrile, 1,2,3-propanetricarbonitrile, 1,3,6-hexanetricarbonitrile, 1,2,6-hexanetricarbonitrile, 1,2,3-tris(2-cyanoethoxy)propane or 1,2,4-tris(2-cyanoethoxy)butane, and combinations thereof.

In some embodiments, based on the total weight of the electrolyte, the content of the acrylic compound is about 0.01 wt % or above. In some embodiments, the content of the acrylic compound is about 0.05 wt % or above. In some embodiments, the content of the acrylic compound is about 1 wt % or above. In some embodiments, the content of the acrylic compound is about 2 wt % or above. In some embodiments, the content of the acrylic compound is about 10 wt % or below. In some embodiments, the content of the acrylic compound is about 6 wt % or below. In some embodiments, the content of the acrylic compound is about 5 wt % or below. In some embodiments, the content of the acrylic compound is about 0.01 wt % to about 10 wt %. In some embodiments, the content of the acrylic compound is about 1 wt % to about 6 wt %.

Examples of other organic solvents are dimethyl sulfoxide, 1,3-propane sultone, sulfolane, methyl sulfolane, 1,3-dimethyl-2-imidazolidinone, N-methyl-2-pyrrolidone, formamide, dimethylformamide, trimethyl phosphate, triethyl phosphate, trioctyl phosphate, tripropyl phosphate and a combination thereof.

In some embodiments, in the cell of the lithium-ion battery, a separator is arranged between the cathode tab and the anode tab to prevent short circuit. The material and shape of the separator used in the cell of the present application are not particularly limited, and may be any of the techniques disclosed in the prior art. In some embodiments, the separator includes a polymer or an inorganic substance and the like formed by a material stable in the electrolyte of the present application.

For example, the separator may include a substrate layer and a surface treatment layer. The substrate layer is a nonwoven fabric, a film or a composite film having a porous structure, and the material of the substrate layer is at least one selected from polyethylene, polypropylene, polyethylene terephthalate and polyimide. Specifically, a polypropylene porous film, a polyethylene porous film, polypropylene nonwoven cloth, polyethylene nonwoven cloth or a polypropylene-polyethylene-polypropylene porous composite film can be adopted.

At least one surface of the substrate layer is provided with the surface treatment layer, and the surface treatment layer may be a polymer layer or an inorganic substance layer, or may be a layer formed by mixing a polymer and an inorganic substance.

The inorganic substance layer includes inorganic particles and a binder, and the inorganic particles are selected from one or a combination of several of aluminum oxide, silicon oxide, magnesium oxide, titanium oxide, hafnium oxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide and barium sulfate. The binder is selected from one or a combination of several of polyvinylidene fluoride, vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene and polyhexafluoropropylene. The polymer layer includes a polymer, and the material of the polymer is at least one selected from polyamide, polyacrylonitrile, acrylate polymer, polyacrylic acid, polyacrylate, polyvinylpyrrolidone, polyvinyl ether, polyvinylidene fluoride and poly(vinylidene fluoride-hexafluoropropylene).

The separator needs to have mechanically robustness to withstand the stretching and piercing of the electrode material, and a pore size of the separator is typically less than 1 micron. Various separators including microporous polymer membranes, non-woven mats and inorganic membranes have been used in the lithium ion batteries, wherein the polymer membranes based on microporous polyolefin materials are the most commonly used separators in combination with the electrolyte. The microporous polymer membranes can be made very thin (typically about 5 μm-25 μm) and highly porous (typically about 20%-50%) to reduce electrical resistance and improve ion conductivity. Meanwhile, the polymer membrane still has mechanical robustness. A person skilled in the art will appreciate that various separators widely used in the lithium ion batteries are suitable for use in the present application.

Although the foregoing illustrates by taking the lithium ion battery as an example, after reading the present application, a person skilled in the art can conceive that the cathode material of the present application can be used for other suitable electrochemical devices. Such electrochemical devices include any device for electrochemical reaction, and specific examples thereof include all kinds of primary batteries, secondary batteries, fuel cells, solar cells or capacitors. In particular, the electrochemical device is a lithium secondary battery, including a lithium metal secondary battery, a lithium ion secondary battery, a lithium polymer secondary battery, or a lithium ion polymer secondary battery.

IV. Application

The electrochemical device manufactured from the electrode tab according to the present application is suitable for the electronic devices in various fields.

The use of the electrochemical device of the present application is not particularly limited and can be used for any use known in the art. In one embodiment, the electrochemical device of the present application can be used for, but not limited to, notebook computers, pen input computers, mobile computers, e-book players, portable telephones, portable fax machines, portable copy machines, portable printers, headset stereo headphones, VCRs, LCD TVs, portable cleaners, portable CD players, mini disc players, transceivers, electronic notebooks, calculators, memory cards, portable recorders, radios, backup powers, motors, cars, motorcycles, power bicycles, bicycles, lighting fixtures, toys, game consoles, clocks, power tools, flashlights, cameras, large household batteries, lithium ion capacitors, and the like.

Hereinafter, the preparation and efficiency of the lithium ion battery of the present application are described by taking the lithium ion battery an example and with reference to the specific embodiments for preparing a cathode material of the present application and test manners for the electrochemical device. A person skilled in the art will understand that the preparing method described in the present application is merely an example, and any other suitable preparing methods are within the scope of the present application.

V. Embodiments

Preparation of Lithium Ion Battery

A cathode active material is used to prepare a lithium ion battery by the following method. Specifically, the cathode active material, a conductive agent and a binder are sufficiently stirred and uniformly mixed in a certain weight ratio in N-methylpyrrolidone to form a cathode slurry. Then the obtained cathode slurry is used to uniformly coat the front and back surfaces of a cathode current collector aluminum foil, and dried at 85° C. to obtain a cathode active material layer. Afterward, the cathode active material layer is subjected to cold pressing, slitting, slice cutting and welding of a cathode tab to obtain a cathode.

An anode active material, a binder and a dispersing agent are sufficiently stirred and uniformly mixed in a certain weight ratio in deionized water to form an anode slurry. Then the anode slurry is used to uniformly coat the front and back surfaces of an anode current collector copper foil and dried at 85° C. to form an anode active material layer. Afterward, the anode active material layer is subjected to cold pressing, slitting, slice cutting and welding of an anode tab to obtain an anode.

The lithium salt $LiPF_6$ and the non-aqueous organic solvent (ethylene carbonate (EC): diethyl carbonate (DEC): propylene carbonate (PC): propyl propionate (PP): vinylene carbonate (VC)=20:30:20:28:2, mass ratio) are prepared to a solution according to the mass ratio of 8:92, as an electrolyte of the lithium ion battery.

The separator is made of a ceramic-coated polyethylene (PE) material separator.

The cathode, the separator, and the anode are stacked in order, so that the separator is between the cathode and the anode for the function of isolation. The electrode assembly is placed in a package, the electrolyte is injected, packaging is performed, and then formation is performed to obtain the final lithium-ion battery.

Test Methods of the Electrode

(I) Direct Current Resistance (DCR) Test of the Electrode

A circular plate of the same area is cut out in a first region and a second region of the electrode respectively, and an electrode active material on one side of a substrate is scraped off to only retain the electrode active material on the other side. A lithium ion battery is assembled with the above electrode only with the electrode active material on one side and the metal lithium electrode, and the lithium ion battery is placed on an impedance meter to respectively test direct current resistance values of the electrodes of the first region and second regions.

The lithium ion battery is charged to 4.2 V at a constant current of 1.5 C, and then charged to 0.05 C at a constant voltage. The lithium ion battery is discharged at a current of 1 C for 30 min such that the cell is at a charge ratio of 50%, and stands for 60 min. The lithium ion battery is discharged at a current of 0.1 C for 10 s, and voltage V1 is recorded. The lithium ion battery is then discharged at a current of 1 C for 1 s, and stands for 60 min, and steady-state voltage V2 is recorded. The DCR is calculated according to the following formula: $R=(V2-V1)/(1 C-0.1 C)$.

(II) Thickness Test of the Electrode

The thickness of the electrode is measured using a 0.1 μm high precision digital micrometer (Mitutoyo brand). An assembled cell is disassembled, the electrode plate is taken out, and surface residue is washed away with a diethyl carbonate (DEC) solvent; a micrometer test head is wiped with dust-free paper to remove foreign matters to ensure the test accuracy; and the plate is put into the micrometer test head, a micrometer handle is rotated to closely contact the plate, and a thickness value is read. Ten different points on the plate are selected and ten pieces of thickness data are averaged.

DETAILED DESCRIPTION OF EMBODIMENTS

(I) Embodiments 1-9 and Comparative Examples 1-10

Embodiments 1-9 relate to partitioned coating on a cathode and no partitioned coating on an anode. The preparation methods of the cathodes in Embodiments 1-9 and Comparative Examples 1-10 will be specifically described below:

Preparation Method of the Electrode of Embodiment 1

(1) Preparation of Slurry

Cathode $LiNi_{0.8}Co_{0.1}Mn_{0.1}O_2/LiCoO_2$ slurry: a cathode active component $LiNi_{0.8}Co_{0.1}Mn_{0.1}O_2/LiCoO_2$, a conductive agent Super-P and a binder polyvinylidene fluoride (PVDF) were mixed according to a weight ratio of 97%:1.5%:1.5%, diluted with an appropriate amount of N-methylpyrrolidone, and then stirred in a vacuum mixer to form an uniform cathode slurry.

Anode graphite slurry: an anode active component graphite, a binder styrene-butadiene rubber (SBR) and a dispersing agent carboxymethyl cellulose (CMC) were mixed according to a weight ratio of 97%:1%:2%, diluted with an appropriate amount of distilled water, and then stirred in a vacuum mixer to form an uniform anode slurry.

(2) Cathode Partitioned Coating

Cathode partitioned coating: Partitioned coating was performed as follows:

A. The $LiNi_{0.8}Co_{0.1}Mn_{0.1}O_2$ slurry prepared in step (1) was used to coat one side of a body region (hereinafter referred to as a first cathode region) of an aluminum foil by a body coating head, and the $LiCoO_2$ slurry prepared in step (1) was used to coat the side of the region that was 10 mm from an edge of the body region (hereinafter referred to as a second cathode region) by an edge coating head. The single-sided coated electrode was placed in a high-temperature oven at 85° C. and dried; and B. the above single side-coated electrode was subjected to second side coating, and the coating method, region and material were the same as those described in step A. The double side-coated electrode was placed in a high-temperature oven at 85° C. and dried to obtain the cathode of Embodiment 1.

(3) Anode Coating

C. The anode slurry prepared in step (1) was used to coat one side of the copper foil substrate, and the single side-coated electrode was placed in a high-temperature oven at 85° C. and dried; and D. the above single side-coated electrode was subjected to second side coating, and the coating method, region and material were the same as those described in step C. The double side-coated electrode was placed in a high-temperature oven at 85° C. and dried to obtain the anode of Embodiment 1.

Preparation Methods of the Electrodes of Embodiments 2-9

Embodiments 2-9 differed from Embodiment 1 only in that different cathode active materials (Embodiments 2 and 3), active materials of different crystal structures (Embodiment 4), active materials of different particle diameters (Embodiment 5), active materials coated with different carbon contents (Embodiment 6), different contents of a conductive agent added (Embodiments 7 and 8), and different undercoat layers (Embodiment 9) were adopted to respectively coat the first cathode region and the second cathode region. See Table 1 for details.

Preparation Methods of the Electrodes of Comparative Examples 1-10

Comparative Examples 1-10 respectively corresponded to Embodiments 1-9. In Comparative Examples 1-10, the cathodes were not subjected to partitioned coating, but were prepared only according to a conventional process. See Table 1 for the differences between the comparative examples and their corresponding embodiments.

TABLE 1

| | The first cathode region | The second cathode region | Thickness of the first anode region before cycle (μm) | Thickness of the second anode region before cycle (μm) | Thickness of the first anode region after 500 cycles (μm) | Thickness of the second anode region after 500 cycles (μm) |
|---|---|---|---|---|---|---|
| Species of cathode active material | | | | | | |
| Embodiment 1 | $LiNi_{0.8}Co_{0.1}Mn_{0.1}O_2$ | $LiCoO_2$ | 132.6 | 125.2 | 161.2 | 150.2 |
| Embodiment 2 | $LiNi_{0.6}Co_{0.2}Mn_{0.2}O_2$ | $LiCoO_2$ | 98.2 | 92.9 | 118.4 | 112.6 |
| Embodiment 3 | $LiNi_{0.5}Co_{0.2}Mn_{0.3}O_2$ | $LiCoO_2$ | 92.8 | 87.2 | 110.4 | 105.6 |
| Comparative Example 1 | $LiNi_{0.8}Co_{0.1}Mn_{0.1}O_2$ | $LiNi_{0.8}Co_{0.1}Mn_{0.1}O_2$ | 131.3 | 126.5 | 160.9 | 185.5 |
| Comparative Example 2 | $LiCoO_2$ | $LiCoO_2$ | 98.5 | 92.6 | 119.2 | 138.6 |
| Comparative Example 3 | $LiNi_{0.5}Co_{0.2}Mn_{0.3}O_2$ | $LiNi_{0.5}Co_{0.2}Mn_{0.3}O_2$ | 92.1 | 88.2 | 112.9 | 130.5 |
| Crystal structure of cathode active material | | | | | | |
| Embodiment 4 | $LiNi_{0.8}Co_{0.1}Mn_{0.1}O_2$ polycrystal | $LiNi_{0.8}Co_{0.1}Mn_{0.1}O_2$ monocrystal | 104.5 | 100.6 | 127.8 | 124.9 |
| Comparative Example 4 | $LiNi_{0.8}Co_{0.1}Mn_{0.1}O_2$ polycrystal | $LiNi_{0.8}Co_{0.1}Mn_{0.1}O_2$ polycrystal | 103.9 | 100.2 | 128.9 | 142.1 |
| Comparative Example 5 | $LiNi_{0.8}Co_{0.1}Mn_{0.1}O_2$ monocrystal | $LiNi_{0.8}Co_{0.1}Mn_{0.1}O_2$ monocrystal | 104.7 | 101.2 | 127.5 | 147.4 |
| Particle diameter of cathode active material | | | | | | |
| Embodiment 5 | $LiFePO_4$ having Dv50 of 0.5 μm | $LiFePO_4$ having Dv50 of 2 μm | 94.7 | 90.2 | 117.3 | 114.3 |
| Comparative Example 6 | $LiFePO_4$ having Dv50 of 0.5 μm | $LiFePO_4$ having Dv50 of 0.5 μm | 94.9 | 90.7 | 118.3 | 136.0 |

TABLE 1-continued

|  | The first cathode region | The second cathode region | Thickness of the first anode region before cycle (μm) | Thickness of the second anode region before cycle (μm) | Thickness of the first anode region after 500 cycles (μm) | Thickness of the second anode region after 500 cycles (μm) |
| --- | --- | --- | --- | --- | --- | --- |
| Carbon coating amount of cathode active material | | | | | | |
| Embodiment 6 | LiFePO$_4$ coated with 3 wt % carbon | LiFePO$_4$ coated with 1 wt % carbon | 97.2 | 93.6 | 121.1 | 118.4 |
| Comparative Example 7 | LiFePO$_4$ coated with 3 wt % carbon | LiFePO$_4$ coated with 3 wt % carbon | 96.8 | 94.2 | 124.1 | 141.8 |
| Content of conductive agent in cathode | | | | | | |
| Embodiment 7 | 2 wt % conductive carbon black added (LiFePO$_4$) | 1 wt % conductive carbon black added (LiFePO$_4$) | 77.7 | 73.1 | 94.3 | 88.2 |
| Embodiment 8 | 2 wt % conductive carbon black (LiCoO$_2$) | 1 wt % conductive carbon black (LiCoO$_2$) | 81.3 | 78.9 | 99.4 | 95.3 |
| Comparative Example 8 | 2 wt % conductive carbon black added (LiFePO$_4$) | 2 wt % conductive carbon black added (LiFePO$_4$) | 78.7 | 74.4 | 96.2 | 115.6 |
| Comparative Example 9 | 2 wt % conductive carbon black (LiCoO$_2$) | 2 wt % conductive carbon black (LiCoO$_2$) | 81.9 | 79.3 | 101.4 | 120.8 |
| Undercoat layer in cathode | | | | | | |
| Embodiment 9 | No undercoat buffer layer | Undercoat ceramic layer (thickness being 0.5 μm) | 81.8 | 76.7 | 99.4 | 93.0 |
| Comparative Example 10 | No undercoat buffer layer | No undercoat buffer layer | 82.1 | 76.9 | 101.2 | 125.9 |

*In the lithium ion battery, the lithium deposition phenomenon of the anode is more serious than that of the cathode. Therefore, the thickness parameter of the anode in a fully charged state is used to measure the extent of lithium deposition of the lithium ion battery, thereby reflecting the safety performance of the lithium ion battery.

Referring to the data of Embodiments 1-9 and Comparative Examples 1-10 shown in Table 1, it is known that by coating the cathode thin region with a cathode active material with a slightly poorer kinetic performance, in monocrystal particles, having a larger particle diameter or having a lower carbon coating amount, by reducing the content of the conductive agent in the cathode thin region, or by coating the substrate of the cathode thin region with an undercoat layer having lower conductivity, the extent of lithium deposition in the anode thin region can be effectively reduced, thereby enhancing the safety performance of the lithium ion battery.

(II) Embodiments 10-14 and Comparative Examples 11-15

Embodiments 10-14 and Comparative Examples 11-15 only relate to partitioned coating on the anode and no partitioned coating on the cathode. The preparation methods of the anodes in Embodiments 10-14 and Comparative Examples 11-15 will be specifically described below:

Preparation Method of the Electrode of Embodiment 10

(1) Preparation of Slurry

Anode graphite/hard carbon slurry: an anode active component graphite/hard carbon, a binder styrene-butadiene rubber (SBR) and a dispersing agent carboxymethyl cellulose (CMC) were mixed according to a weight ratio of 97%:1%:2%, diluted with an appropriate amount of distilled water, and then stirred in a vacuum mixer to form the uniform anode slurry.

Cathode LiNi$_{0.8}$Co$_{0.1}$Mn$_{0.1}$O$_2$ slurry: a cathode active component LiNi$_{0.8}$Co$_{0.1}$Mn$_{0.1}$O$_2$, a conductive agent Super-P and a binder polyvinylidene fluoride (PVDF) were mixed according to a weight ratio of 97%:1.5%:1.5%, diluted with an appropriate amount of N-methylpyrrolidone, and then stirred in a vacuum mixer to form the uniform cathode slurry.

(2) Anode Partitioned Coating

Anode partitioned coating: Partitioned coating was performed as follows:

A. The graphite slurry prepared in step (1) was used to coat one side of a body region (hereinafter referred to as a first anode region) of a copper foil by a body coating head, and the hard carbon slurry prepared in step (1) was used to coat the side of the region that was 10 mm from an edge of the body region (hereinafter referred to as a second anode region) by an edge coating head. The single-sided coated electrode was placed in a high-temperature oven at 85° C. and dried; and B. the above single side-coated electrode was subjected to second side coating, and the coating method, region and material were the same as those described in step A. The double side-coated electrode was placed in a high-temperature oven at 85° C. and dried to obtain the anode of Embodiment 2.

(3) Cathode Coating

C. The cathode slurry prepared in step (1) was used to coat one side of the aluminum foil substrate, and the single side-coated electrode was placed in a high-temperature oven at 85° C. and dried; and D. the above single side-coated electrode was subjected to second side coating, and the coating method, region and material were the same as those described in step C. The double side-coated electrode was placed in a high-temperature oven at 85° C. and dried to obtain the cathode of Embodiment 5.

Preparation Methods of the Electrodes of Embodiments 11-14

Embodiments 11-14 differed from Embodiment 10 only in that different anode active materials (Embodiment 11), active materials of different particle diameters (Embodiment 12), different contents of a conductive agent added (Embodiment 13), and different undercoat layers (Embodiment 14) were adopted to respectively coat the first anode region and the second anode region. See Table 2 for details.

Preparation Methods of the Electrodes of Comparative Examples 11-15

Comparative Examples 11-15 respectively corresponded to Embodiments 10-14. In Comparative Examples 11-15, the anodes were not subjected to partitioned coating, but were prepared only according to a conventional process. See Table 2 for the differences between the comparative examples and their corresponding embodiments.

TABLE 2

| | The first anode region | The second anode region | Thickness of the first anode region before cycle ($\mu m$) | Thickness of the second anode region before cycle ($\mu m$) | Thickness of the first anode region after 500 cycles ($\mu m$) | Thickness of the second anode region after 500 cycles ($\mu m$) |
|---|---|---|---|---|---|---|
| Kinds of anode active material | | | | | | |
| Embodiment 10 | Graphite | Hard carbon | 101.7 | 96.3 | 121.4 | 116.7 |
| Embodiment 11 | 5 wt % Si/20 wt % Sn/75 wt % $SnO_2$ | 50 wt % graphite/50 wt % hard carbon | 71.1 | 66.3 | 106.7 | 101.5 |
| Comparative Example 11 | Graphite | Graphite | 100.2 | 95.5 | 122.3 | 140.6 |
| Comparative Example 12 | 5 wt % Si/20 wt % Sn/75 wt % $SnO_2$ | 5 wt % Si/20 wt % Sn/75 wt % $SnO_2$ | 71.0 | 67.0 | 105.8 | 126.6 |
| Particle diameter of anode active material | | | | | | |
| Embodiment 12 | Graphite, Dv50 = 15 $\mu m$ | Graphite, Dv50 = 10 $\mu m$ | 86.3 | 83.5 | 103.9 | 101.7 |
| Comparative Example 13 | Graphite, Dv50 = 15 $\mu m$ | Graphite, Dv50 = 15 $\mu m$ | 86.7 | 83.4 | 102.4 | 121.3 |
| Content of conductive agent in anode | | | | | | |
| Embodiment 13 | Graphite, no conductive carbon black added | Graphite, 2 wt % conductive carbon black added | 92.2 | 87.4 | 115.0 | 106.9 |
| Comparative Example 14 | Graphite, no conductive carbon black added | Graphite, no conductive carbon black added | 92.5 | 87.2 | 113.7 | 128.3 |
| Undercoat layer on anode substrate | | | | | | |
| Embodiment 14 | Graphite, undercoat layer is 20 wt % conductive carbon black and 80 wt % $LiFePO_4$ | Graphite, undercoat layer is conductive carbon black | 99.8 | 93.8 | 120.7 | 113.2 |
| Comparative Example 15 | Graphite, undercoat layer is 20 wt % conductive carbon black and 80 wt % $LiFePO_4$ | Graphite, undercoat layer is 20 wt % conductive carbon black and 80 wt % $LiFePO_4$ | 99.1 | 94.8 | 121.7 | 140.3 |

Referring to the data of Embodiments 10-14 and Comparative Examples 11-15 shown in Table 2, it is known that by coating an anode active material with a better kinetic performance or having a smaller particle diameter on the anode thin region, by increasing the content of the conductive agent in the anode thin region, or by coating an undercoat layer having a higher conductivity on the substrate of the anode thin region, the extent of lithium deposition in the anode thin region can be effectively reduced, thereby enhancing the safety performance of the lithium ion battery.

(III) Embodiments 15-17 and Comparative Examples 16-17

Embodiments 15-17 and Comparative Examples 16-17 only relate to lithium ion batteries assembled from anodes and cathodes, and their electrochemical materials, resistance data, and thickness data before and after cycle are shown in Table 3.

This shows that by setting the resistances of different regions of the electrode of the lithium ion battery to achieve $C_2 \leq C_1$, the extent of lithium deposition in the anode thin region can be effectively reduced, thereby enhancing the safety performance of the lithium ion battery.

References to "some embodiments", "part of embodiments", "one embodiment", "another example", "example", "specific example" or "part of examples" in the whole specification mean that at least one embodiment or example in the application includes specific features, structures, materials or characteristics described in the embodiments or examples. Thus, the descriptions appear throughout the specification, such as "in some embodiments", "in an embodiment", "in one embodiment", "in another example", "in one example", "in a specific example" or "an example", which does not necessarily refer to the same embodiment or example in the present application. Furthermore, the specific features, structures, materials or characteristics in the descriptions can be combined in any suitable manner in one or more embodiments or examples.

TABLE 3

| | The material in the first anode/cathode region | The material in the second anode/cathode region | Direct current resistance value $R_{A1}$ of the first anode region ($\Omega \cdot cm^2$) | Direct current resistance value $R_{A2}$ of the second anode region ($\Omega \cdot cm^2$) | Direct current resistance value $R_{C1}$ of the first cathode region ($\Omega \cdot cm^2$) | Direct current resistance value $R_{C2}$ of the second cathode region ($\Omega \cdot cm^2$) |
|---|---|---|---|---|---|---|
| Embodiment 15 | $LiCoO_2$ (2 wt % conductive carbon black)/graphite (no conductive carbon black added) | $LiCoO_2$ (1 wt % conductive carbon black)/graphite (no conductive carbon black added) | 584 | 580 | 312 | 389 |
| Embodiment 16 | $LiCoO_2$ (2 wt % conductive carbon black)/graphite (no conductive carbon black added) | $LiCoO_2$ (2 wt % conductive carbon black)/graphite (2 wt % conductive carbon black) | 591 | 501 | 315 | 312 |
| Embodiment 17 | $LiCoO_2$ (2 wt % conductive carbon black)/graphite (no conductive carbon black added) | $LiCoO_2$ (1 wt % conductive carbon black)/graphite (2 wt % conductive carbon black) | 589 | 503 | 314 | 391 |
| Comparative Example 16 | $LiCoO_2$ (2 wt % conductive carbon black)/graphite (no conductive carbon black added) | $LiCoO_2$ (2 wt % conductive carbon black)/graphite (no conductive carbon black added) | 585 | 583 | 310 | 313 |
| Comparative Example 17 | $LiCoO_2$ (2 wt % conductive carbon black)/graphite (2 wt % conductive carbon black) | $LiCoO_2$ (2 wt % conductive carbon black)/graphite (2 wt % conductive carbon black) | 499 | 505 | 309 | 311 |

| | $C_1$ ($R_{A1}/R_{C1}$) | $C_2$ ($R_{A2}/R_{C2}$) | Thickness of the first anode region before cycle (μm) | Thickness of the second anode region before cycle (μm) | Thickness of the first anode region after 500 cycles (μm) | Thickness of the second anode region after 500 cycles (μm) |
|---|---|---|---|---|---|---|
| Embodiment 15 | 1.9 | 1.5 | 95.3 | 92.9 | 115.3 | 111.8 |
| Embodiment 16 | 1.9 | 1.6 | 95.2 | 93.0 | 117.5 | 112.5 |
| Embodiment 17 | 1.9 | 1.3 | 95.8 | 93.2 | 118.6 | 113.1 |
| Comparative Example 16 | 1.9 | 1.9 | 95.6 | 93.1 | 116.1 | 136.8 |
| Comparative Example 17 | 1.6 | 1.6 | 96.5 | 94.5 | 117.2 | 138.3 |

Referring to the data shown in Table 3, it is known that after 500 charge-discharge cycles, the thickness of the electrode thin region of the lithium ion battery ($C_2 < C_1$) shown in Embodiments 15-17 was significantly smaller than the thickness of the electrode thin region of the lithium ion battery ($C_2 > C_1$) shown in Comparative Examples 16-17.

Although the illustrative embodiments have been shown and described, it should be understood by a person skilled in the art that the above embodiments cannot be interpreted as limiting the present application, and the embodiments can be changed, substituted and modified without departing from the spirit, principle and scope of the present application.

What is claimed is:

1. A lithium secondary battery, comprising:
a partitioned cathode, the partitioned cathode comprising a cathode substrate having a first cathode region, a second cathode region and an uncoated region of the cathode substrate in sequence, wherein a surface of the cathode substrate is coated with a first cathode active material to form the first cathode region and coated with a second cathode active material different from the first cathode material to form the second cathode region;
a partitioned anode, the partitioned anode comprising an anode substrate having a first anode region, a second anode region and an uncoated region of the anode substrate in sequence, wherein a surface of the anode substrate is coated with a first anode active material to form the first anode region and coated with a second anode active material different from the first anode material to form the second anode region, a thickness of the second anode region being less than a thickness of the first anode region,
wherein a value $C_1$ comprises a ratio of a direct current resistance value $R_{A1}$ of the first anode region to a direct current resistance value $R_{C1}$ of the first cathode region;
wherein a value $C_2$ comprises a ratio of a direct current resistance value $R_{A2}$ of the second anode region to a direct current resistance value $R_{C2}$ of the second cathode region; and
wherein $C_2 < C_1$.

2. The lithium secondary battery according to claim 1, wherein a direct current resistance value $R_{A2}$ of the second anode region is less than or equal to 98% of a direct current resistance value $R_{A1}$ of the first anode region; and/or
wherein a direct current resistance value $R_{C2}$ of the second cathode region is greater than the direct current resistance value $R_{C1}$ of the first cathode region.

3. The lithium secondary battery according to claim 1, wherein the partitioned anode further comprises a third anode region between the second anode region and the uncoated region of the anode substrate,
wherein a direct current resistance value $R_{A3}$ of the third anode region is less than or equal to the direct current resistance value $R_{A2}$ of the second anode region.

4. The lithium secondary battery according to claim 1, wherein the partitioned cathode further comprises a third cathode region,
wherein a direct current resistance value $R_{C3}$ of the third cathode region is greater than or equal to the direct current resistance value $R_{C2}$ of the second cathode region.

5. The lithium secondary battery according to claim 1, wherein the partitioned anode further comprises a fourth anode region between the second anode region and the uncoated region of the anode substrate,
wherein the fourth anode region comprises an insulation material.

6. The lithium secondary battery according to claim 1, wherein the partitioned cathode further comprises a fourth cathode region between the second cathode region and the uncoated region of the cathode substrate,
wherein the fourth cathode region comprises an insulation material.

* * * * *